(12) United States Patent
Olapinski et al.

(10) Patent No.: US 6,635,180 B2
(45) Date of Patent: Oct. 21, 2003

(54) PROCESS AND APPARATUS FOR THE PURIFICATION AND/OR TREATMENT OF SUSPENSIONS

(75) Inventors: Hans Olapinski, Aichwald (DE); Hans-Peter Feuerpeil, Schwäbisch Gmünd (DE); Dieter Bläse, Mutlangen (DE)

(73) Assignee: Membraflow GmbH & Co. KG Filtersysteme, Aalen-Essingen (DE)

( * ) Notice: Subject to any disclaimer, the term of this patent is extended or adjusted under 35 U.S.C. 154(b) by 0 days.

(21) Appl. No.: 09/764,957

(22) Filed: Jan. 18, 2001

(65) Prior Publication Data

US 2001/0030157 A1 Oct. 18, 2001

(30) Foreign Application Priority Data

Jan. 20, 2000 (AZ) .......................................... 2000/0232
Jan. 20, 2000 (DE) ......................................... 100 02 381

(51) Int. Cl.⁷ .............................................. B01D 61/00
(52) U.S. Cl. ...................... 210/651; 210/650; 210/638; 210/639; 210/195.2; 210/257.2
(58) Field of Search ................................ 210/650, 651, 210/638, 639, 195.2, 257.2

(56) References Cited

U.S. PATENT DOCUMENTS

| | | | |
|---|---|---|---|
| 4,311,521 A | * | 1/1982 | Harper et al. |
| 5,266,203 A | | 11/1993 | Mukhopadhyay et al. .. 210/638 |
| 5,693,229 A | * | 12/1997 | Hartmann |
| 5,753,125 A | | 5/1998 | Kreisler ...................... 210/710 |
| 5,766,478 A | * | 6/1998 | Smith et al. |
| 6,113,797 A | * | 9/2000 | Al-Samadi |
| 6,296,770 B1 | * | 10/2001 | Wilcox et al. |
| 6,348,154 B1 | * | 2/2002 | Stewart |

FOREIGN PATENT DOCUMENTS

| | | |
|---|---|---|
| DE | 293142 A5 | 8/1991 |
| DE | 19806796 A1 | 9/1999 |
| EP | 0263953 A1 | 8/1987 |
| EP | 0829752 A2 | 3/1998 |
| JP | XP-002168599 | 2/1980 |
| JP | XP-002168600 | 9/1995 |

* cited by examiner

*Primary Examiner*—Ana Fortuna
(74) *Attorney, Agent, or Firm*—Ohlandt, Greeley, Ruggiero & Perle, LLP

(57) ABSTRACT

The invention relates to a process for the purification and/or treatment of suspensions, which include at least one or more precious metals and/or rare earths or other elements in the form of a precipitate or solid and/or also in dissolved form, which includes the following steps:

concentrating or thickening the precipitate or solid in the suspension by removal of the liquid phase by means of a membrane filter apparatus, whereby dissolved impurities and/or precious materials are discharged with filtrate;

washing of the concentrated or thickened suspension by addition of a wash liquid and removal of filtrate by means of the membrane filter apparatus, whereby the concentration or thickening of the solids in the suspension does not or changes only slightly during washing and the concentration or thickening of the dissolved impurities and/or precious materials still present in the suspension are reduced to a pre-determined value; and complete drainage of the membrane filter apparatus to provide, in purified form, solid and/or purified precipitates of the precious metal(s) and/or rare earths or other elements remaining in residual suspension for further treatment and/or further application.

21 Claims, 3 Drawing Sheets

PROCESS AND APPARATUS FOR THE PURIFICATION AND/OR TREATMENT OF SUSPENSIONS

FIELD OF INVENTION

The invention relates to a process and an apparatus for the purification and/or treatment of suspensions, which contain at least one or more precious metals and/or rare earths or other elements in the form of a precipitate or sediment.

BACKGROUND TO INVENTION

During the manufacture of pure precious metals and/or rare earths and/or other elements of the Periodic System or their salts, the precious metal or the rare earth or the element is dissolved in a corresponding suitable solvent. In addition to the specific element or precious metal, other elements, which are similar regarding the dissolving behaviour, normally also dissolved and this can constitute impurities.

By adding precipitating agents specifically suited to the respective element or regulation of the solution equilibrium with a corresponding buffer solution or pH-shift, it is possible to selectively precipitate from the solution the desired individual elements or precious metals or rare earths. This results in a suspension, which contains the deposited precipitate or the solid as well as the materials still remaining in the solution.

To obtain the desired precious metal and/or element in purest form, it is necessary to purify the desired deposited precipitate present in the suspension.

According to the state of the art, the washing and purification of such precipitated precious metals from the suspension occur in so-called glove-boxes, in which the liquid phase moves through a filter medium by application of a vacuum, which becomes quickly covered and impermeable due to the extreme fine solids: To prevent this the solution is stirred manually. To wash about 10 kg of platinum hydroxide with such a process about 10 to 15 working days are needed.

A further disadvantage of such processes with glove boxes is the burden on the environment.

Object of the invention is thus to provide a process and an apparatus by means of which these disadvantages can be prevented. Particularly, the washing should occur in a closed-system in the process in accordance with the invention, least possible washing liquid is required and the washing of quantities in the region of for example 10 kg of platinum occurs in the shortest possible time, preferably in less than one working day.

SUMMARY OF INVENTION

According to the invention, a process for the purification and/or treatment of suspensions, which include at least one or more precious metals and/or rare earths or other elements in the form of a precipitate or solid and/or also in dissolved form, includes the following steps:

1. concentrating or thickening the precipitate or solid in the suspension by removal of the liquid phase by means of a membrane filter apparatus, whereby dissolved impurities and/or precious materials are discharged with filtrate;
2. washing of the concentrated or thickened suspension by addition of a washing liquid and removal of filtrate by means of the membrane filter apparatus, whereby the concentration or thickening of the solids in the suspension does not or changes only slightly during washing and the concentration or thickening of the dissolved impurities and/or precious materials still present in the suspension are reduced to a pre-determined value; and
3. complete drainage of the membrane filter apparatus to provide, in purified form, solid and/or purified precipitates of the precious metal(s) and/or rare earths or other elements remaining in residual suspension for further treatment and/or further application.

The invention therefore proposes that the solids contained in the suspension or the precipitate initially are concentrated or thickened by removing the liquid phase of the suspension by means of a membrane filter apparatus, whereby the dissolved impurities and/or precious materials are carried out with the filtrate. By means of the concentration or the thickening, the concentration of the solid or precipitate is increased in the suspension. After reaching the maximum possible reduction of the starting volume, the suspension is washed by addition of a washing liquid and the removal of the filtrate by means of the membrane filter apparatus. Thereby the dissolved impurities and/or precious metals or elements remaining in the solution are reduced to a predetermined value. To improve the efficiency of the washing the liquid can also contain additives or buffer solutions.

After the washing of the suspension containing the insoluble precipitate, the membrane plant is completely drained. The desired product, i.e. the purified precipitate of the precious metal(s) and/or rare earths or other elements are then available in highest purified form for further application or further processing.

The process according to the invention is suitable, in particular, for recovering one or more of the following elements: gold, platinum, rhodium, palladium, ruthenium, iridium, osmium, cobalt, europium, lanthanum, germanium, gallium, cerium, tantalum, niobium, selenium, tellurium, cadmium, bismuth, beryllium, uranium, manganese, in highest purified form as precipitate or in dissolved form.

The washing liquids are appropriately chosen according to the specific chemical behaviour of the element to be scrubbed out.

In particular, the washing liquid may contain acetic acid and/or ammonium nitrate and/or sodium carbonate or sodium bicarbonate and/or hydrochloric acid and/or nitric acid and/or aqua regia.

In a preferred embodiment form, it is provided that the concentration of the impurities still dissolved in the liquid phase of the suspension after scrubbing, lies in the range of 50 mg per liter to 0.001 mg per liter.

The process temperature of both the concentrating and also the washing by means of the membrane filter apparatus lies in the range of 5° C. to 150° C., during the treatment of rhodium hydroxide preferably between 75° C. and 85° C. and during the treatment of platinum hydroxide preferably between 40° C. and 50° C.

Preferably, the membrane fitter apparatus used for the concentrating and washing, is operated according to a tangential flow filtration process, i.e. the membrane, which serves as fitter body, is over flowed over by a continuous speed tangential to the membrane surface, so that deposits of materials on the membrane surface are substantially prevented by the tangential flushing.

Impurities, which deposit in the pores despite the flowing over, can be removed from the membrane surface by the introduction of a back flush impulse during the operation. Such a back flush impulse removes large impurities from the surface of the membrane by mechanical separation.

The nominal pore size of the membranes of the membrane filter apparatus may be in the range between 5 nm and 1,4 μm, whereby specially preferred are membranes with a separating size of 50 to 100 nm.

Membranes of ceramics, polymeric materials, metal or inorganic materials may be used as membranes in the membrane filter plant. Especially preferred is the use of ceramic membranes or membranes of other inorganic materials due to their high chemical and physical stabilities.

The operating pressure in the membrane filter apparatus or its modules lies in the range of 0.5 to 50 bar, preferably in the range of 2 to 6 bar.

Also according to the invention there is provided an apparatus for the operation of a process as set out herein, characterised thereby, that the apparatus includes:

at least one pre-tank, and at least a membrane filter apparatus.

The apparatus for the operation of the process is therefore characterised thereby, that it includes at least one storage apparatus or pre-tank, in which the suspension to be treated is introduced and thickened, as well as a membrane filter apparatus with which the concentrating and washing can take place. A very decisive advantage lies therein that the filter apparatus in an embodiment of the invention is constructed in such a way, that it can be completely drained by gravity or positive gas pressure. This ensures that no residues remain in the pump sump after emptying and a product in highest purified form can be removed from the plant as slurry/suspension.

For impurities of the membrane filter apparatus, which cannot be removed by mechanical back pulse, it is advantageous if the membrane filter apparatus is provided with a cleaning apparatus, which makes it possible to introduce cleaning liquid to the membrane module(s), which chemically dissolves the absorbate layers deposited on the membranes. Chemical cleaning substances for this are, for example, acetic acid or hydrochloric acid or nitric acid or aqua regia or HF-acids. For example, HF-acids are used to dissolve polymeric silicic acid.

Concerning the different purification processes of membrane modules in membrane filter apparatus, reference is made to WO 99/42203, the contents of which is considered to be fully incorporated in the present application.

In a first embodiment form, the membrane filter apparatus can consist of one membrane module. Alternatively, the membrane apparatus can also include a number of membrane modules, which are located either in series or parallel. These membrane modules can either be back flushed together or individually.

In a further embodiment of the invention, it is provided that the membrane filter apparatus consists of several in series arranged membrane loops, which can be removed individually from the operation and/or be back flushed individually or together.

BRIEF DESCRIPTION OF DRAWINGS

The invention will now be described by way of example with reference to the accompanying schematic drawings.

In the drawings there is shown in.

DETAILED DESCRIPTION OF DRAWINGS

Figure 1:
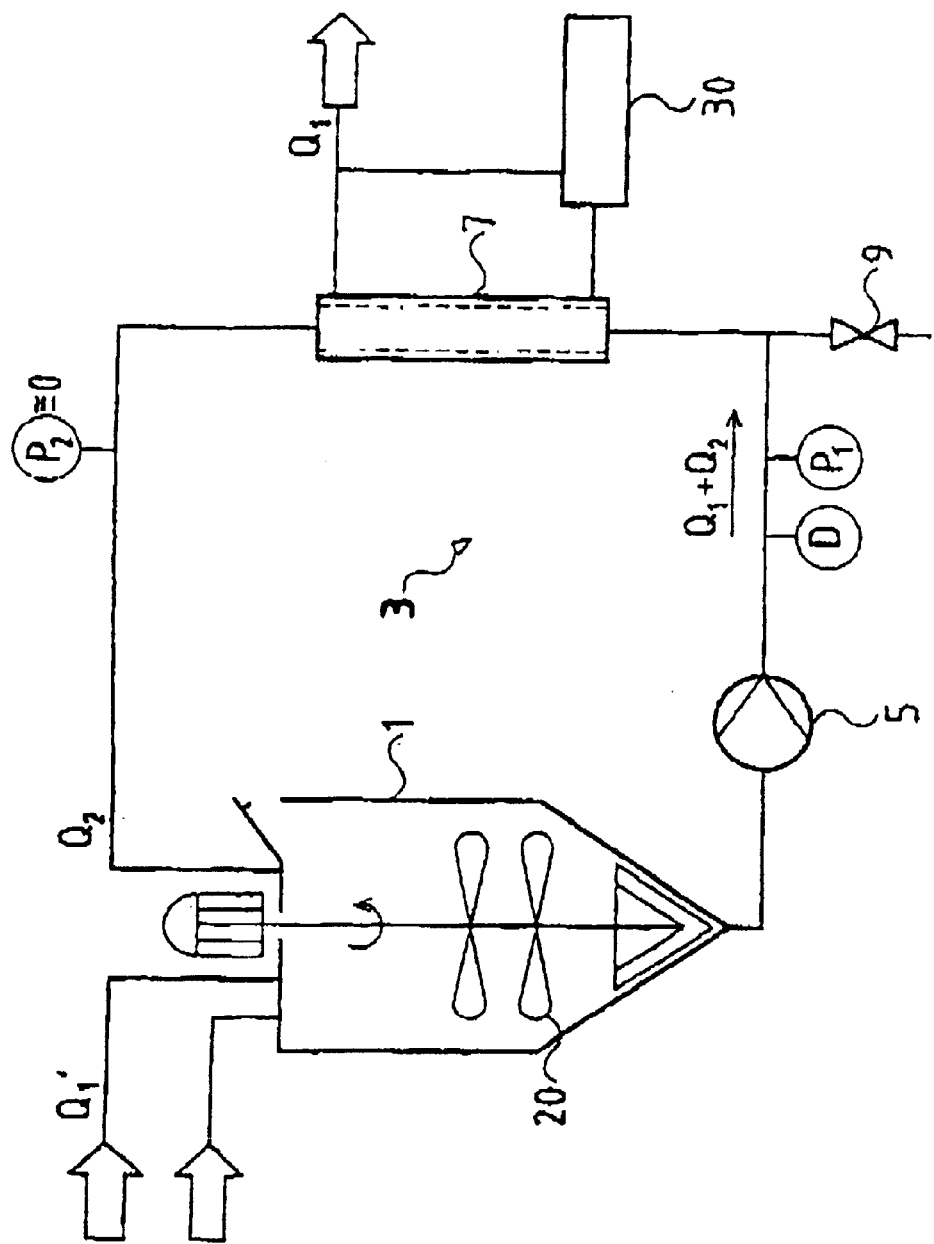
FIG. 1 A schematic illustration of an open cycle with a reservoir container and a membrane filter apparatus, including a membrane module, in accordance with the invention.

The invention wall now be explained for the two materials rhodium and platinum by means of two examples.

EXAMPLE 1

Rhodium hydroxide is the starting material for a number of rhodium salt solutions, for example rhodium sulphate, rhodium nitrate or rhodium phosphate. Rhodium hydroxide is normally obtained by treating a solution of hexachlororhodate with sodium hydroxide. The resulting sediment or the resulting precipitate of rhodium hydroxide is contaminated with the reaction by-product sodium chloride. The reaction is as follows:

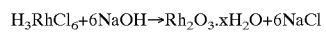

$$H_3RhCl_6 + 6NaOH \rightarrow Rh_2O_3 \cdot xH_2O + 6NaCl$$

With the process in accordance with the invention the sodium chloride can be efficiently removed from the suspension, which contains the precipitated rhodium hydroxide. In addition, the suspension containing the rhodium hydroxide precipitate is concentrated in accordance with the invention and being water containing ammonium nitrate as washing liquid the sodium chloride impurities are removed by is means of the membrane filter technique.

In particular, the NaCl-impurities, which are present on the particles of the rhodium hydroxide even after the removal of the liquid phase of the suspension during the thickening, can be eliminated by means of the washing. This is decisive to obtain the desired high-purified rhodium salt and/or to be able to produce it later.

EXAMPLE 2

Platinum hydroxide is a starting material for a number of platinum salt solutions for example platinum nitrate. Platinum hydroxide is obtained by treatment of a solution of potassium or sodium hexachloroplatinate with potassium or sodium hydroxide and the subsequent neutralisation of the solution with acetic acid. The precipitate resulting from this is extremely fine and corresponding difficult to wash out.

The reaction is as follows:

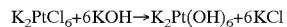

$$K_2PtCl_6 + 6KOH \rightarrow K_2Pt(OH)_6 + 6KCl$$

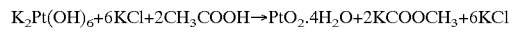

$$K_2Pt(OH)_6 + 6KCl + 2CH_3COOH \rightarrow PtO_2 \cdot 4H_2O + 2KCOOCH_3 + 6KCl$$

In the suspension with the platinum hydroxide precipitate, both potassium acetate as well as potassium chloride are contained as impurities. By means of the process according to the invention, the suspension containing the platinum hydroxide precipitate can be concentrated by means of a membrane filter plant and the impurities dissolved in the liquid phase, for example potassium acetate and potassium chloride, can be reduced by washing with a suitable aqueous scrubbing liquid, which can also contain acetic acid, after the concentrating by means of the membrane filter plant to a predetermined degree.

In addition to the above describe purification techniques of suspensions with the help of a membrane filter apparatus, in which initially the solid material is concentrated in the suspension and subsequently the impurities are washed out, it is also possible, to use a membrane filter apparatus for the separation of a specific element and/or several elements from a suspension containing a number of elements. In such a case, the desired product leaves the membrane filter in the permeate in dissolved form, however the solid materials remain in the retentate. With such a process, the washing then has the object to wash out the desired, dissolved element or the desired dissolved elements from the slurry or the suspension. The solids remaining in the slurry can be removed from the membrane filter apparatus or be dissolved out of the membrane filter apparatus by means of a suitable solvent, or after the dissolving and washing out of an element or several elements, the process can be repeated with a specific solvent suitable for other elements in the virtually closed system.

The following embodiment example should serve as an example for such an application of a membrane filter plant:

EXAMPLE 3

One of the first steps during the production of platinum is, for example, the dissolving of a metal ore in a suitable solvent. The solution contains then for example platinum, palladium, rhodium, ruthenium, iridium and osmium as well as a number of further metallic elements. To separate platinum from this solution, the solution is treated with sodium bromate. This causes that all the above-mentioned metals, with the exception of platinum, precipitate as a "bromate mud". This bromate slurry can only be filtrated or purified with greater difficulty and contains in its liquid part normally a considerable amount of platinum. By means of a membrane filter apparatus platinum, which lies dissolved in the liquid phase, can be separated from the slurry or the suspension. Therewith it is possible, to recover all the platinum dissolved in the suspension by means of the membrane filter apparatus. Furthermore, the slurry remaining in the membrane filter can repeatedly be treated with corresponding solvents. This enables, for example, the separation of the insoluble osmiums and rutheniums from the rest of the metals, in that the metals dissolved in the suitable solvents passed through the membrane filter with the permeate, while the insoluble osmium and ruthenium remain in the non-filtered residue. Aqueous solutions, which can contain sodium carbonate or sodium bi-carbonate or their ammonium compounds, can be used as washing liquid of this bromate sediment.

Figure 3:
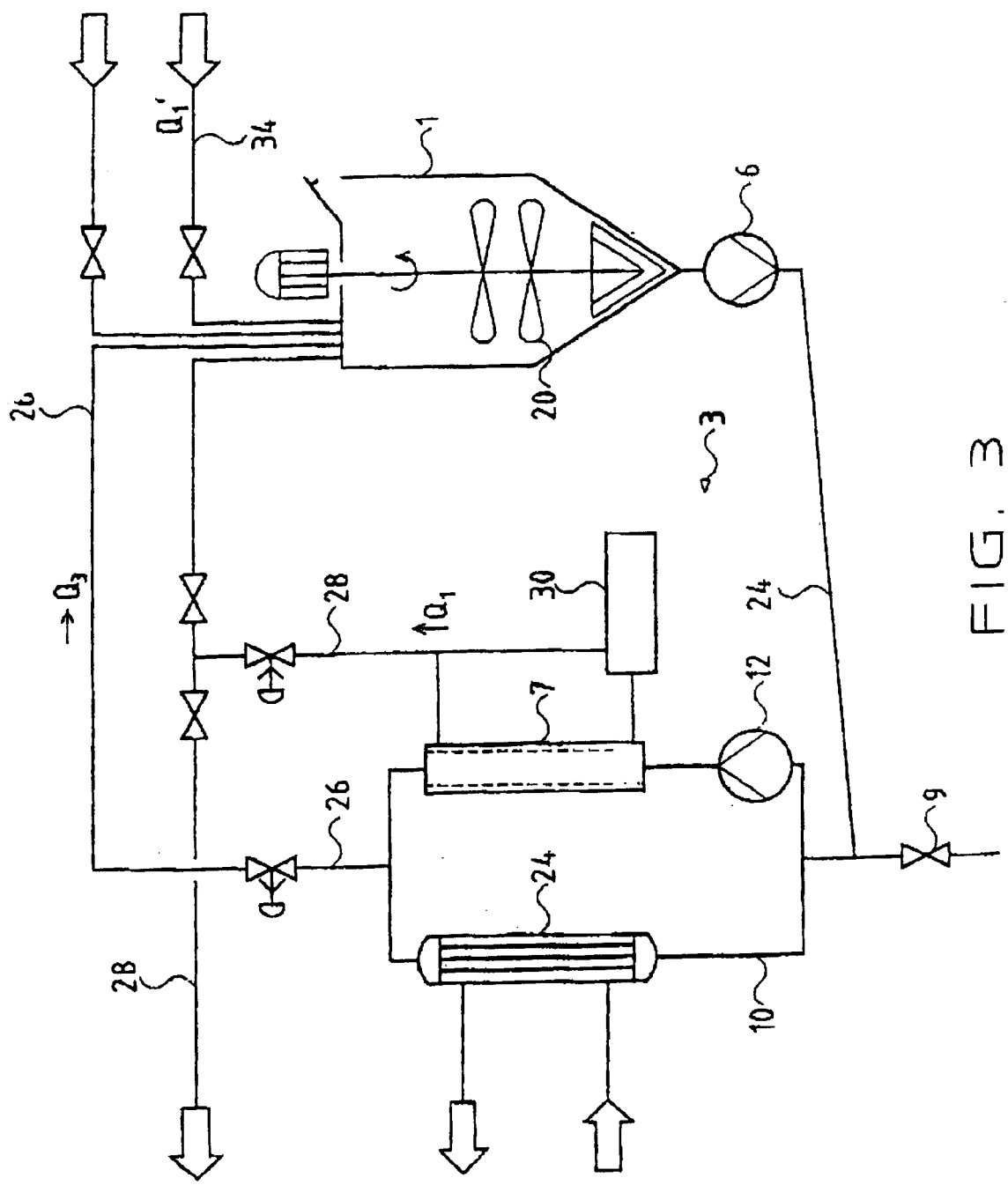
FIG. 3 A system with pre-tank and agitator located therein as well as a membrane cycle in accordance with the invention.

Hereafter a membrane filter apparatus, which is suitable for the operation of the process in accordance with the invention, is described. The apparatus for the operation of the process includes a reservoir container or pre-tank 1, in which, for example, the suspension to be purified is introduced. The pre-tank 1 can include optionally a stirring device as depicted in FIG. 3. From the pre-tank 1 the liquid phase is supplied to the membrane filter apparatus 3. The membrane filter apparatus 3 includes a pump 5, which transfers the liquid phase from the reservoir container 1 to the membrane module 7. The membrane module 7 is provided in the present embodiment form with ceramic membranes or membranes of other inorganic materials with a nominal pore size of for example 5 to 1 400 nm.

The membrane filter apparatus in the present case is operated according to the principle of tangential flow filtration. The tangential flow filtration is characterised by the presence of two volume streams, a stream $Q_1$ at speed $V_1$ of the filtrate perpendicular to the membrane surface, the so-called permeate speed, and a stream $Q_2$ at speed $V_2$ tangential to the membrane surface, the so-called cross flow speed. The volume stream $Q_1$ determines the filter or the permeate output and the volume stream $Q_2$ the cross flow volume, which substantially prevents the deposit of materials on the membrane surface by tangential flushing. With the process in accordance with the invention, a large part of the liquid phase of the suspension is removed as permeat during the concentrating step. By the continuous removal of the permeat with the volume stream $Q_1$ the liquid phase in the suspension is continuously reduced, so that the solids concentrate in the present suspension.

After the volume of the suspension has been reduced to the smallest possible value, washing liquid is added to wash out the dissolved material. To this a volume stream of wash liquid $Q'_1$ is added, whereby the middle volume stream of the added wash liquid in an embodiment form corresponds exactly with the average flow rate of the permeate removed over the membrane filter apparatus. By continuous addition of renewed wash liquid $Q'_1$ the concentration of dissolved materials and/or the impurities in the liquid phase of the concentrated suspension is continuously reduced to a pre-determined value.

If the predetermined purification degree has been achieved, the addition of wash liquid is terminated and the complete membrane plant is completely drained by means of valve 9. Hereby it is achieved, that no residues remain in the membrane filter apparatus and in the storage container and that the product is present in highest purified form as solid in the discharge container, in which the total suspension/slurry is completely discharged by gravity and/or by blowing out with suitable gas under positive pressure.

Figure 2:
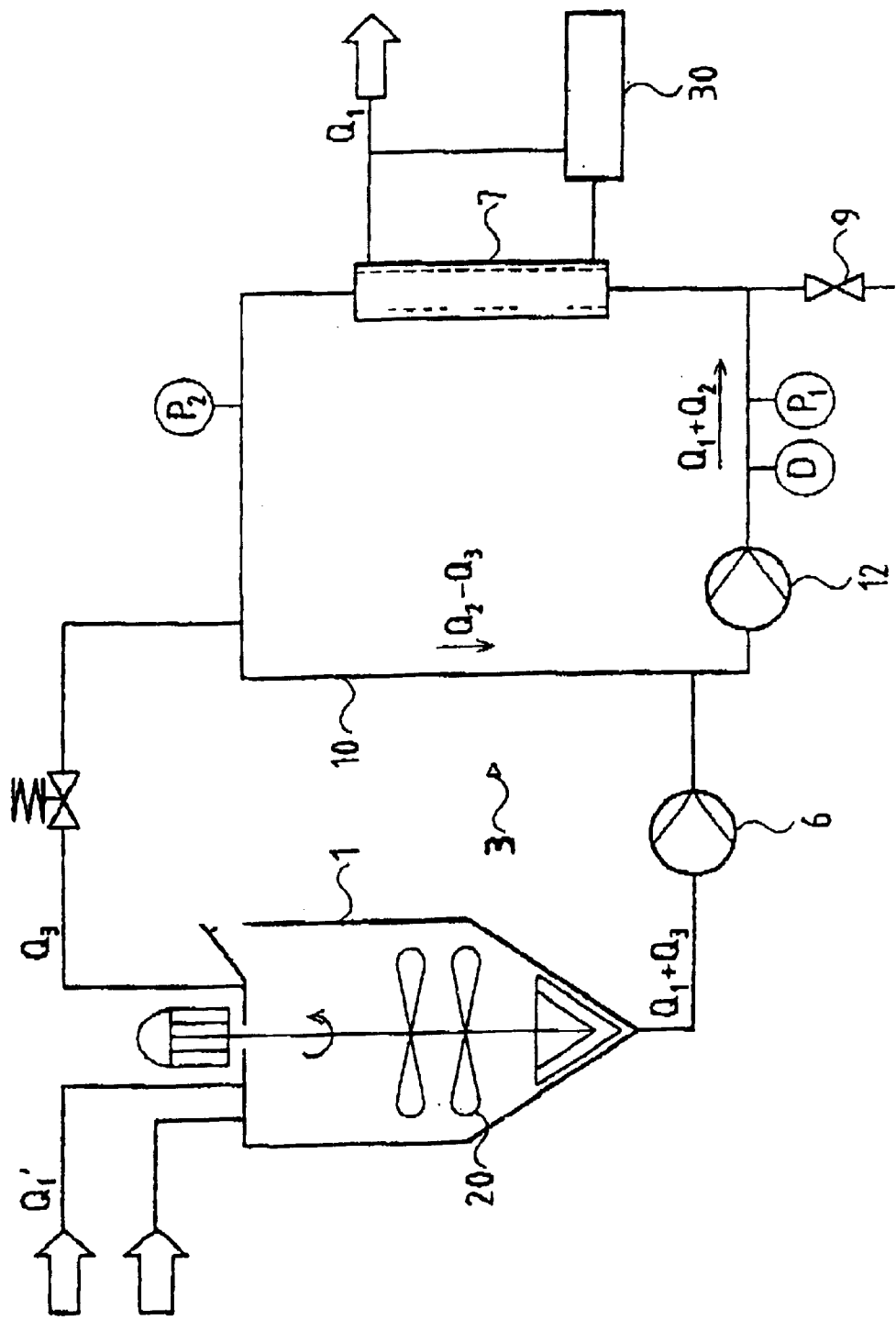
FIG. 2 A modified semi-open system for batch operation including a pre-tank or reservoir container, a membrane filter apparatus with a membrane module and a membrane cycle in accordance with the invention.

In FIG. 2, an alternative configuration for the operation of the process in accordance with the invention is illustrated. Same component parts as in FIG. 1 are identified with the same reference numerals.

In contrast to FIG. 1, the membrane filter apparatus 3 includes a closed-cycle 10 in which the volume stream $Q_2$–$Q_3$ is continuously stirred by means of a pump 12. The cross flow volume is again the stream $Q_2$. The stream $Q_3$ is returned as retentate to the reservoir container 1. By continuous removal of the permeate with the volume stream $Q_1$ the suspension is again concentrated. After the completion of the concentrating step, washing liquid is added as in the process according to FIG. 1, with the average flow rate $Q'_1$.

By addition of the wash liquid, the concentration of the materials and/or impurities dissolved in the suspension is continuously reduced, until a pre-determined value is reached, whereby the remaining dissolved impurities and/or materials lie preferably in the range of 50 mg per liter up to 0.001 mg per liter. Then the total plant is drained again via valve 9 and the concentrated solid with the suspension/slurry is removed in highest purified form.

In FIG. 2, the continuous circulation of the volume stream $Q_2$–$Q_3$ takes place by means of the pump 12. In the arrangement in FIG. 2, a pressure $P_2$ at the outlet of the membrane module is maintained by the pump 6. The pressure difference between the inlet to the membrane module 7 and the outlet from the membrane module is therewith $\Delta P = P_1 - P_2$.

In the system according to FIG. 1, the pressure $P_2$ at the outlet is about 0, that means the pressure difference $\Delta P$ over the membrane module is $P_1 - P_2$, whereby this pressure $P_1$ is created solely by the pump 5, which also causes the tangential cross flow of the membrane.

If the membrane apparatus illustrated in FIG. 1 and FIG. 2 is used therefore, for example to filter out platinum from a mixture, then the elements mentioned in embodiment example 3 except, for example, the platinum remaining in the solution, can be precipitated by a suitable precipitation agent. The liquid phase, containing the platinum to be recovered, is fed to the membrane filter apparatus as in the case of purification of a suspension. The metal to be recovered is then contained in the liquid phase removed as permeat, the solids to be removed remain in the retentate.

By addition of suitable solvents, the desired elements can be successively converted to the dissolved form out of the solids present in the pre-tank 1 or in the membrane cycle and be removed by means of the membrane filter apparatus in the permeate.

In FIG. 3, a modified construction of a membrane filter apparatus for the operation of the above described process is illustrated. Once again, the apparatus includes a pre-tank 1, which includes an agitator 20 for stirring of the suspension introduced to the pre-tank 1. From the pre-tank 1, the suspension contained in the reservoir container 1 is transferred by means of the pump 6 via conduit 24 to the membrane filter apparatus 3. The membrane filter apparatus 3 includes a membrane module 7, which is preferably provided with ceramic membranes or membranes of other inorganic materials. A pump 12 is provided for the circulation of a predetermined volume flow in the membrane cycle 10 and a heat exchanger 24 arranged in the membrane cycle, which is served by a heat transfer liquid, enables the removal of heat from/or the addition of heat to the product cycle. The retentate is furthermore added via conduit 26 to the reservoir container 1, the permeat is removed via conduit 28. For purification of the membrane module 7, the apparatus is provided, in accordance with FIG. 3, with a back flush apparatus 30. By introduction of a back flush impulse impurities deposited on the membrane surface can be mechanically removed.

When the washing procedure is completed, the total plant can be drained by valve 9, which is arranged in such a way, that the total plant can run completely empty, so that the highly purified solid is present in the discharge container connected after or inserted after the valve 9. The addition of washing liquid, which corresponds essentially to the average permeate flow rate, takes place via conduit 34.

With the present invention and the present process a first possibility is provided to obtain precious metals or their precipitates, in particular of platinum, rhodium or ruthenium, in a closed-system in high purified form with impurities, which are less than 50 mg per liter to 0.001 mg per liter. The wash times can be considerably reduced and due to the treatment in a virtually closed-system, both the environmental influence as well as the danger of the leaking of precious metals or rare earths or other precious materials can be reduced.

What is claimed is:

1. A process for purifying and treating a suspension having a material being selected from the group consisting of one or more rare earth materials, one or more precious metals, an impurity, and any combinations thereof, wherein the material is in a form being selected from the group consisting of a solid, a precipitate, dissolved, and any combinations thereof, the process comprising:

concentrating the material in the suspension using a membrane filter apparatus by removing a liquid in a form of a filtrate from the suspension to obtain a concentrated suspension, wherein said filtrate has a material selected from the group consisting of a dissolved impurity, a precious material, and any combinations thereof;

washing said concentrated suspension by adding an amount of a wash liquid that is an aqueous solution having a predetermined chemical action with the material, said wash liquid being selected from the group consisting of an acetic acid, an ammonium nitrate, a sodium carbonate, a sodium bicarbonate, a hydrochloric acid, a nitric acid, an aqua regia, and any combinations thereof;

removing said wash liquid in the form of said filtrate using said membrane filter apparatus such that a concentration of the material in the solid form or in the precipitate form is essentially not changed and a concentration of the material in the dissolved form is reduced to a predetermined value; and draining said membrane filter apparatus, wherein the material is provided in a purified form.

2. The process of claim 1, wherein the material is selected from the group consisting of a gold, a platinum, a rhodium, a palladium, a ruthenium, an iridium, an osmium, a cobalt, a europium, a lanthanum, a germanium, a gallium, a cerium, a tantalum, a niobium, a selenium, a tellurium, a cadmium, a bismuth, a beryllium, a uranium, a manganese, and any combinations thereof.

3. The process of claim 1, wherein the material in the solid form or in the precipitate form and said dissolved impurity in said concentrated suspension after said washing is in a range of 50 mg per liter to 0.001 mg per liter.

4. The process of claim 1, wherein said filtrate has the material being in said dissolved form.

5. The process of claim 1, wherein a process temperature of the process is in a range including 5° C. to 150° C.

6. The process of claim 1, wherein said membrane filter apparatus further comprises a membrane loop and at least one heat exchanger being disposed in a position selected from the group consisting of a position in said membrane loop, a position at an inlet of said membrane loop, and a position at a return of said membrane loop to a reservoir.

7. The process of claim 6, wherein said reservoir has a temperature regulating device or a piping for temperature controlling.

8. The process of claim 1, wherein said membrane filter apparatus operates according to a tangential flow filtration means.

9. The process of claim 8, further comprising the step of back flushing said membrane filter apparatus at one or more predetermined time intervals.

10. The process of claim 1, wherein said membrane filter apparatus has a membrane with a pore size selected from the group consisting of a nominal pore size, a pore size in a range including 5 nm to 1.4 $\mu$m, and a pore size in a range of 50 nm to 100 nm.

11. The process of claim 1, wherein said membrane filter apparatus has a membrane selected from the group consisting of a ceramic, a polymeric material, a metal, an inorganic material, a physically stable material, a chemically stable material, and any combinations thereof.

12. The process of claim 1, wherein said membrane filter has an operating pressure, said operating pressure being in a range of 0.5 bar to 50 bar.

13. The process of claim 1, wherein said precipitate is a rhodium precipitate and a process temperature of the process is in a range of 75° C. to 85° C.

14. The process of claim 1, wherein said precipitate is a platinum precipitate and a process temperature is in a range of 40° C. to 50° C.

15. The process of claim 1, wherein said membrane filter has an operating pressure, said operating pressure being in a range of 2 bar to 6 bar.

16. An apparatus for purifying and treating a suspension having a material selected from the group consisting of one or more rare earth materials, one or more precious metals, an impurity, and any combinations thereof, wherein the material is in a form selected from the group consisting of a precipitate, a solid, dissolved, and any combinations thereof, the apparatus comprising:

- a reservoir being fluidly connected to a membrane filter apparatus, said membrane filter apparatus for concentrating the material in the suspension by removing a liquid in a form of a filtrate from the suspension to obtain a concentrated suspension, wherein said filtrate has the material selected from the group consisting of a dissolved impurity, a precious metal, and any combination thereof;
- a wash liquid dispensing apparatus adapted to dispense a wash liquid in an aqueous solution in the suspension in said reservoir, said wash liquid having a predetermined chemical action with the material, said wash liquid being one selected from the group consisting of an acetic acid, an ammonium nitrate, a sodium carbonate, a sodium bicarbonate, a hyrdochloric acid, a nitric acid, an aqua regia, and any combinations thereof;
- said membrane filter apparatus removing said wash liquid in the form of said filtrate such that a concentration of the material being in the solid form or in the precipitate form is essentially not changed and a concentration of the material in the dissolved form is reduced to a predetermined value; and
- means for draining said membrane filter apparatus to provide the solid or precipitate material in a purified form.

17. The apparatus of claim 16, wherein said membrane filter apparatus is completely drained by a method selected from the group consisting of gravity, and positive gas pressure.

18. The apparatus of claim 16, wherein said membrane filter apparatus has a cleaning apparatus for supplying one or more cleaning liquids to said membrane filter apparatus.

19. The apparatus of claim 16, wherein said membrane filter apparatus is selected from the group consisting of one or more modules arranged in series, one or more modules arranged in parallel, one or more modules arranged in series that are back flushed together, one or more modules arranged in series that are back flushed individually, one or more modules arranged in parallel that are back flushed together, one or more modules arranged in parallel that are back flushed individually, and any combinations thereof.

20. The apparatus of claim 16, wherein said membrane filter apparatus is selected from the group consisting of a plurality of membrane cycles arranged in series, a plurality of membrane cycles arranged in parallel, a plurality of membrane cycles adapted to be selectively taken out of operation individually, a plurality of membrane cycles adapted to be back flushed individually, a plurality of membrane cycles adapted to be back flushed together, a plurality of membrane cycles adapted to be drained individually, a plurality of membrane cycles adapted to be back flushed together, and any combinations thereof.

21. A method of purifying and treating a suspension having a material in the suspension comprising:

- concentrating the material in the suspension using a membrane filter apparatus by removing a filtrate to obtain a concentrated suspension, wherein said filtrate has the material selected from the group consisting of a dissolved impurity, a precious material, and any combination thereof;
- washing said concentrated suspension by adding an amount of a wash liquid that is an aqueous solution having a predetermined chemical action with the material, said wash liquid being selected from the group consisting of an acetic acid, an ammonium nitrate, a sodium carbonate, a sodium bicarbonate, a hydrochloric acid, a nitric acid, an aqua regia, and any combinations thereof;
- removing said wash liquid in a form of said filtrate using said membrane filter apparatus such that a concentration of the material in a solid form or in a precipitate form in said concentrated suspension is substantially unchanged and such that the material being in a dissolved form is reduced to a predetermined value;
- draining said membrane filter apparatus to provide the solid or precipitate material in a purified form, said material being selected from the group consisting of gold, platinum, rhodium, palladium, ruthenium, iridium, osmium, cobalt, europium, lanthanum, germanium, gallium, cerium, tantalum, niobium, selenium, tellurium, cadmium, bismuth, beryllium, uranium, manganese, and any combinations thereof.

* * * * *